United States Patent [19]

Yamada et al.

[11] Patent Number: 4,845,655
[45] Date of Patent: * Jul. 4, 1989

[54] CARRY CIRCUIT SUITABLE FOR A HIGH-SPEED ARITHMETIC OPERATION

[75] Inventors: Kouichi Yamada; Masatoshi Mizuno, both of Tokyo, Japan

[73] Assignee: NEC Corporation, Japan

[*] Notice: The portion of the term of this patent subsequent to Aug. 9, 2005 has been disclaimed.

[21] Appl. No.: 164,032

[22] Filed: Mar. 4, 1988

Related U.S. Application Data

[63] Continuation of Ser. No. 686,802, Dec. 27, 1984, Pat. No. 4,763,295.

[30] Foreign Application Priority Data

Dec. 27, 1983 [JP]  Japan ................................. 58-250105
Dec. 28, 1983 [JP]  Japan ................................. 58-247006

[51] Int. Cl.[4] ............................................... G06F 7/50
[52] U.S. Cl. ................................. 364/786; 364/787
[58] Field of Search ..................... 364/786, 787, 788

[56] References Cited

U.S. PATENT DOCUMENTS

| | | | |
|---|---|---|---|
| 3,717,755 | 2/1973 | Briley | 364/786 |
| 3,728,532 | 4/1973 | Pryor | 364/787 |
| 3,843,876 | 10/1974 | Fette et al. | 364/786 |
| 4,152,775 | 5/1979 | Schwartz | 364/786 |
| 4,425,623 | 1/1984 | Russell | 364/786 |
| 4,504,924 | 3/1985 | Cook et al. | 364/787 |

Primary Examiner—Gary V. Harkcom
Assistant Examiner—Tan V. Mai
Attorney, Agent, or Firm—Sughrue, Mion, Zinn, Macpeak & Seas

[57] ABSTRACT

A carry circuit used in an arithmetic unit, such as an adder or a subtractor, has to process a carry operation for producing a carry signal to be transferred to the following carry operation stage according to a carry signal transferred from the previous carry operation stage. To process this carry operation at a high speed, an improved carry circuit performs two operations before the carry signal from the previous stage is received. One of the operations is processed by using a signal representing that the carry signal from the previous stage is present. The other operation is processed by using another signal representing that the carry signal from the previous stage is absent. These two operations have been terminated when the carry signal from the previous stage is received. The carry signal from the previous stage is used to select either one of results of the two operations. Thus, transmission of a carry signal to the following stage can be performed at a high speed.

3 Claims, 5 Drawing Sheets

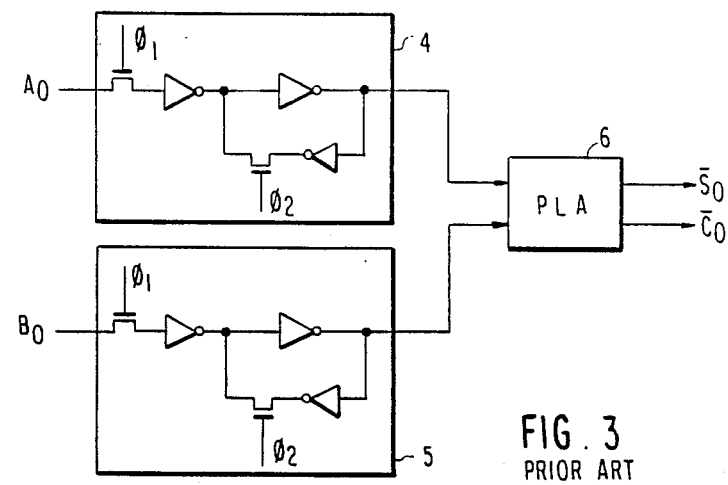
FIG. 3
PRIOR ART
FIG. 4 PRIOR ART
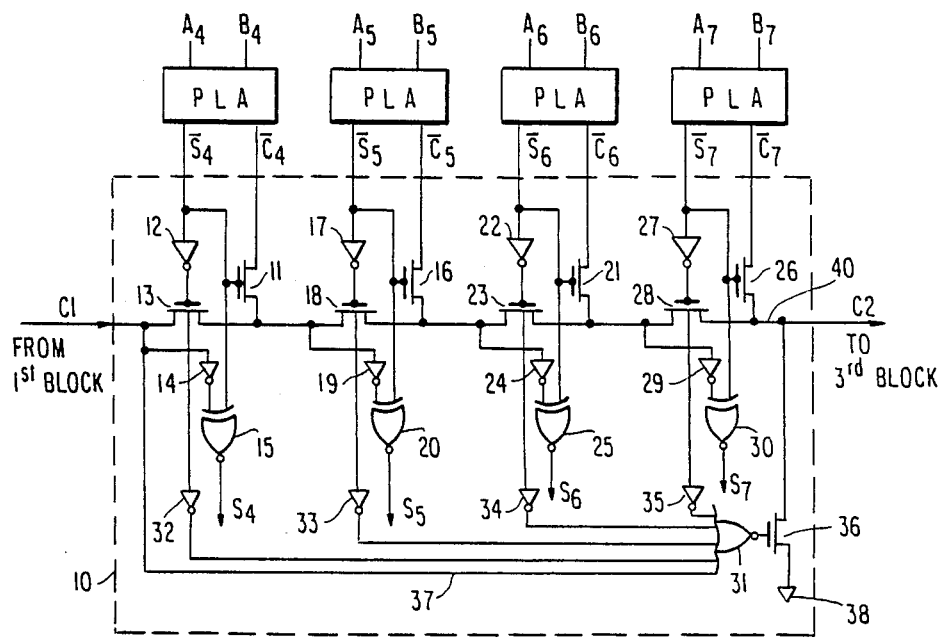

CARRY CIRCUIT SUITABLE FOR A HIGH-SPEED ARITHMETIC OPERATION

This is a continuation of application Ser. No. 686,802 filed 12/27/84, now U.S. Pat. No. 4,763,295.

BACKGROUND OF THE INVENTION

1. Field of the Invention

The present invention relates to a carry circuit and more particularly to a carry circuit used in a digital processing unit which can execute a multi-bit adding operation.

2. Description of the Prior Art

It is well known that, in an adding operation of a digital processing unit, it is very important to perform the processing of a carry signal, indicating an overflow of addition, at a high operating speed. In a parallel multi-bit addition, the existence of the carry signal at one bit section depends on a result of addition at this bit section and the existence of the carry signal from the previous stage.

A well known ripple carry method is the most basic method to process the carry signal, but it is difficult to perform addition at high speed using this method. Particularly, in the addition of a long bit string, e.g., 32 bits or 64 bits, the ripple carry method is unsuitable.

To resolve this problem, a carry look ahead (hereafter called "CLA") method has been proposed. This method is useful in a high-speed adding operation, since the processing of the addition and the processing of the carry signal can be independently performed.

In the CLA method, the carry signal is produced in accordance with a combination of a pair of bits to be added. That is, if both bits to be added are "1", the carry signal necessarily appears. Further, when either one of the bits to be added is "1" and when a carry signal from the previous stage exists, the carry signal also appears. Except for the above-mentioned combinations, no carry signal appears. To realize this method, a decoding logic (e.g., a programmable logic array) may be used in which two bits to be added are applied to respective inputs, and a carry signal is derived from an output in accordance with a combination of these two input bits.

By using the CLA method, a carry signal at each bit section is produced at a high speed, because existence of the carry signal can be determined independently of the result of addition. However, propagation of the produced carry signal from the lower bit portion to the higher bit section is necessary. The propagation of the carry signal is performed through a carry signal line, and therefore the delay of signal propagation is a big problem in the CLA method. This delay has a great influence on an adding operation of a long bit string.

SUMMARY OF THE INVENTION

An object of the present invention is to provide a carry circuit which performs the CLA method at a high speed.

Another object of the present invention is to provide a carry circuit with a short delay time for a carry signal propagation.

Still another object of the present invention is to provide a carry circuit suitable for an addition of a long bit string.

According to the present invention, a carry circuit includes an input section for receiving a carry signal from a previous stage, a first propagation line for propagating a first signal which is preliminarily applied to the carry circuit as a signal indicating existence of the carry signal from the previous stage, a second propagation line for propagating a second signal which is preliminarily applied to the carry circuit as a signal indicating non-existence of the carry signal from the previous stage, a first circuit for processing a carry operation according to the first signal, a second circuit for processing a carry operation according to the second signal, a selecting circuit for selecting either one of the outputs of the first and second circuit according to the carry signal received at the input section, and an output section for transferring the selected output as a carry signal to the following stage.

According to the present invention, carry operations arising when the carry signal from the previous stage is present and when the carry signal is absent can be performed before the carry signal from the previous stage is received into the carry circuit by the first and second circuits, respectively. The carry signal from the previous stage is not used to process the carry operation but is used to select the outputs of the first and second circuits. This selecting operation can be terminated in a short period of time. Therefore, the carry operation can be performed at a high speed.

Further, when a plurality of carry circuits according to the present invention are coupled in series for processing a long bit string, each circuit can simultaneously start a carry operation without waiting for a carry signal from the previous circuit. Thus, the carry propagation delay time can be remarkably reduced.

BRIEF DESCRIPTION OF THE DRAWINGS

FIG. 3 shows a circuit diagram in one bit section ($A_0$, $B_0$) and a decoding circuit for generating a $\overline{SUM}$ signal and a $\overline{CARRY}$ signal;

FIG. 4 shows a circuit diagram of one block of the prior art carry circuit;

DETAILED DESCRIPTION OF THE PREFERRED EMBODIMENTS

Figure 1:
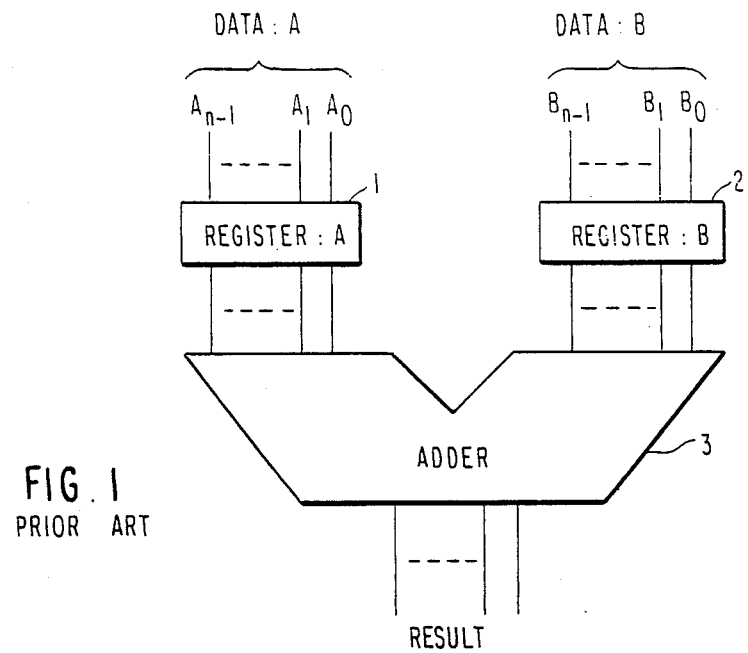
FIG. 1 shows a block diagram of the basic arithmetic unit.
Figure 2:
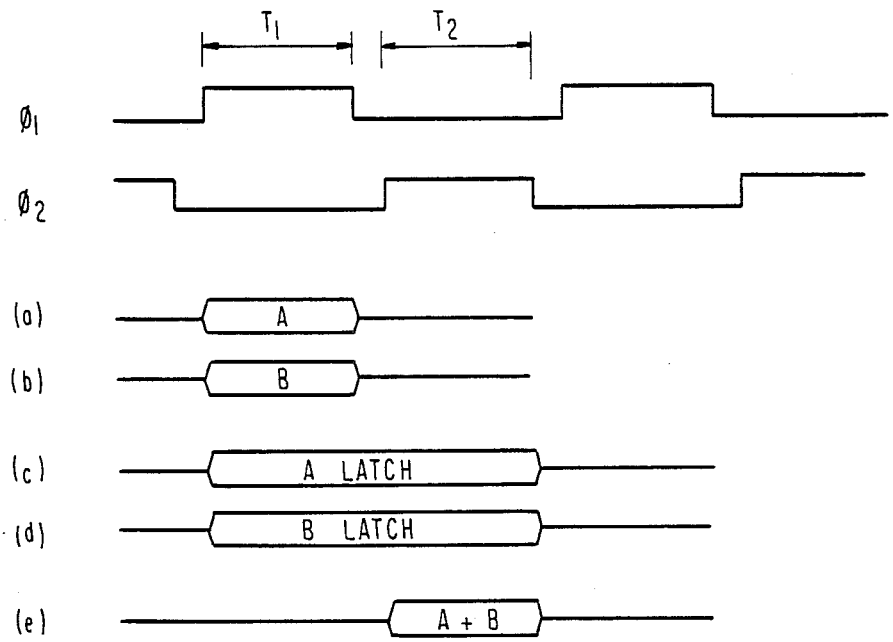
FIG. 2 shows a timing chart of an arithmetic operation of FIG. 1.

An adder circuit is illustrated in FIG. 1. This circuit is a well known data processing apparatus and has a register 1 storing a data A of n-bit length, a register 2 storing a data B of n-bit length and an adder 3. In practical use, an adding operation is performed in accordance with a timing chart of FIG. 2. In a period T1, two data inputs A and B are set in the registers 1 and 2, respectively, as shown in lines (a) and (b) of FIG. 2. This period is a data transmission period. A period T2 is assigned to the adding operation as shown in line (e) of FIG. 2. The registers 1 and 2 latch the respective data A and B in periods T1 and T2 as shown in lines (c) and (d) of FIG. 2. Though the adder performs the bit addition in parallel, a long period of time is required for the addition (period T2) when a long bit length is manipulated, because the propagation delay time of the carry signal is long.

The registers 1 and 2 of FIG. 1 have latches corresponding in number to a bit length of a data string.

For example, a bit $A_0$ of the data A and a bit $B_0$ of the data B are latched in the respective latches 4 and 5 of FIG. 3 and are applied to a decoding means 6 i.e., a programmable logic array (hereinafter referred to as a "PLA") in parallel. The PLA 6 decodes the input two bits $A_0$ and $B_0$ according to a predetermined logical algorithm shown in the following Table 1.

TABLE 1

| SUM | | Carry | $\overline{SUM}$ | $\overline{Carry}$ |
|---|---|---|---|---|
| $A_0$-$A_{n-1}$ | $B_0$-$B_{n-1}$ | $S_0$-$S_{n-1}$ | $C_0$-$C_{n-1}$ | $\overline{S}_0$-$\overline{S}_{n-1}$ | $\overline{C}_0$-$\overline{C}_{n-1}$ |
| 0 | 0 | 0 | 0 | 1 | 1 |
| 1 | 0 | 1 | 0 | 0 | 1 |
| 0 | 1 | 1 | 0 | 0 | 1 |
| 1 | 1 | 0 | 1 | 1 | 0 |

As shown in Table 1, only when the bits $A_0$ and $B_0$ are both "1", a carry signal $C_0$ becomes "1". Of course, the PLA can produce a sum of the bits $A_0$ and $B_0$ as shown in column SUM, that is the PLA 6 has both an adding function of each bit and a carry signal producing function. Therefore, an adding operation is performed in accordance with outputs of the PLA 6. In other words, the adder 3 of FIG. 1 comprises a group of PLAs.

In general, a long data bit string is divided into several blocks, for example a data bit string of 32 bits is divided into 8 blocks each of which has 4 bits. A carry circuit corresponding to one of these 8 blocks is shown in FIG. 4. FIG. 4 shows a 2nd block 10 which includes bits A4 to A7 and bits B4 to B7 and receives $\overline{SUM}$ signals $\overline{S4}$ to $\overline{S7}$ and $\overline{CARRY}$ signals $\overline{C4}$ to $\overline{C7}$. The blocks 10 has four identical stages each of which includes an inverter 12, (17, 22, 27) inverting the signal $\overline{S4}$ ($\overline{S5}$, $\overline{S6}$, $\overline{S7}$), a switching transistor 11 (16, 21, 26), a transfer gate transistor 13 (18, 23, 28), an inverter 14 (19, 24, 29) and an exclusive NOR circuit 15 (20, 25, 30). A carry signal from the 1st stage is propagated through a carry signal propagation line 40 to the 3rd stage. The transfer gate transistors 13, 18, 23, and 28 are inserted into the propagation line 40 in series. The $\overline{CARRY}$ signals $\overline{C4}$ to $\overline{C7}$ are coupled to the propagation line 40 when the respective switching transistor (11, 16, 21, 26) is turned on in response to the $\overline{SUM}$ signal ($\overline{S4}$ to $\overline{S7}$). The exclusive NOR circuits 15, 20, 25 and 30 are used to produce SUM signals S4 to S7 at each bit position by adding the SUM signals S4 to S7 to a carry signal from the previous bit section. Now, it is assumed in this embodiment that the "0" level signal is propagated when the carry signal exists, while the "1" level signal is propagated when no carry signal exists. Therefore, the carry signal from the previous bit section is applied to the exclusive NOR circuits through inverters 14, 19, 24 and 29, respectively.

In FIG. 4, when A4 and B4 are both "0", $\overline{S4}$ signal is "1" and $\overline{C4}$ signal "1" as shown in Table 1. In this case, if the carry signal from the previous bit section (output of the 1st block) is absent, the sum of bits A4 and B4 is "0" and no carry signal is produced. If the carry signal from the previous bit section exists, an output of the exclusive NOR circuit 15 is "1" because a "0" level signal is propagated from the 1st block. Under this condition the transfer gate transistor 13 is turned off and the switching transistor 11 is turned on. Therefore, a "1" level signal indicating that a carry signal from this bit section (A4, B4) is absent is propagated to the following bit section (A5, B5).

If the bits A4 and B4 are both "1", $\overline{S4}$ is "1" and $\overline{C4}$ is "0" as shown in Table 1. Therefore, the transfer gate transistor 13 is turned off, while the switching transistor 11 is turned on. Thus, a "0" level signal indicating the existence of a carry signal from the bit section (A4, B4) is propagated to the following bit section (A5, B5). The exclusive NOR circuit 15 produces a "1"0 when a carry signal from the 1st block is present, while it produces a "0" when the carry signal from the 1st block is absent.

Further, when either one of bits A4 and B4 is "1", $\overline{S4}$ is "0" and $\overline{C4}$ is "1". At this time, the transfer gate transistor 13 is turned on, while the switching transistor 11 is turned off. Therefore, if a carry signal from the 1st block is present, this carry signal is propagated to the following bit section (A5, B5) through the transfer gate transistor 13. The exclusive NOR circuit 15 produces "0" signal as an output of S4. On the other hand, if the carry signal from the 1st block is absent, an ouptut S4 of the exclusive NOR circuit 15 is "1" and the "1" level signal indicating no carry signal is directly propagated to the following bit section through the transfer gate transistor 13.

When either one of the bits in each bit section (A4 and B4, A5 and B5, A6 and B6, and A7 and B7) of the 2nd block 10 is "1", a carry signal to the 3rd block necessarily appears if the carry signal from the 1st block is present. Inverters 32 to 35, a NOR gate circuit 31 and a transistor 36 are used to detect whether the carry signal from the 1st block is to be propagated to the 3rd block through the 2nd block or not. The NOR gate circuit 31 receives the S4 to S7 signals and the carry signal from the 1st block. Therefore, if the carry signal from the 1st block is present, that is, the line 37 is at a "0" level, the transistor 36 is turned on. Thus, the propagation line 40 is directly coupled to the ground potential 38, and a "0" level signal indicating the existence of the carry signal from the 2nd block is propagated to the 3rd block without passing through the transfer gate transistors 13, 18, 23 and 28.

As above-mentioned, the carry circuit having the block 10 of FIG. 4 is driven on the basis of the CLA method. However, each block can not execute the carry operation until the carry signal from the previous block is received or is otherwise determined. Therefore, if each block has a carry propagation delay time ($\Delta t$) can be remarkably reduced.

The block 10' includes four bit sections a4 to a7, in which a6 is omitted. Each section is the same circuit design. For example, the section a4 includes two transfer gate transistors 50 and 51, four switching transistors 52 to 55 and an exclusive NOR circuit 56. A $\overline{S4}$ signal is directly applied to the exclusive NOR circuit 56 and is applied to the transfer gate transistor 50 and 51 via an inverter 57. One switching transistor 52 electrically couples a $\overline{C4}$ signal to a first propagation line 100 in response to the $\overline{S4}$ signal. The other switching transistor 53 electrically couples the C4 signal to a second propagation line 101 in response to the $\overline{S4}$ signal. A first signal source 70 is coupled to an input end of the first propagation line 100 for supplying a "1" level signal. While, a second signal source 71 is coupled to an input end of the second propagation line 101 for supplying a "0" level signal. A VDD voltage source and a ground (GND) voltage source may be used as the first and second signal sources, respectively. The "1"0 level signal is propagated to a first selecting transistor 60 through the first transfer gate transistors 50, 50' and 50". While the "0" level signal is propagated to a second selecting transistor 61 through the second transfer gate transistors 51, 51' and 51". Buffer circuits 62 and 63 are used for buffering a propagation signal level, but may be omitted. The first and second propagation lines 100 and 101 are coupled to the other input end of the exclusive NOR circuit 56 via an inverter 58 and a third switching transistor 54 and an inverter 59 and a fourth switching transistor 55. A carry signal C1 from the previous 1st block is applied to first selecting line 102 via two inverters 80 and 81. An inverted signal of the carry signal C1 is applied to a second selecting line 103 via the inverter 80. The first selecting line 102 is coupled to the third switching transistors 54, 54' and 54" and the first selecting transistor 60. The second selecting line 103 is coupled to the fourth switching transistor 55, 55' and 55" and the second selecting transistor 61.

Figure 5:
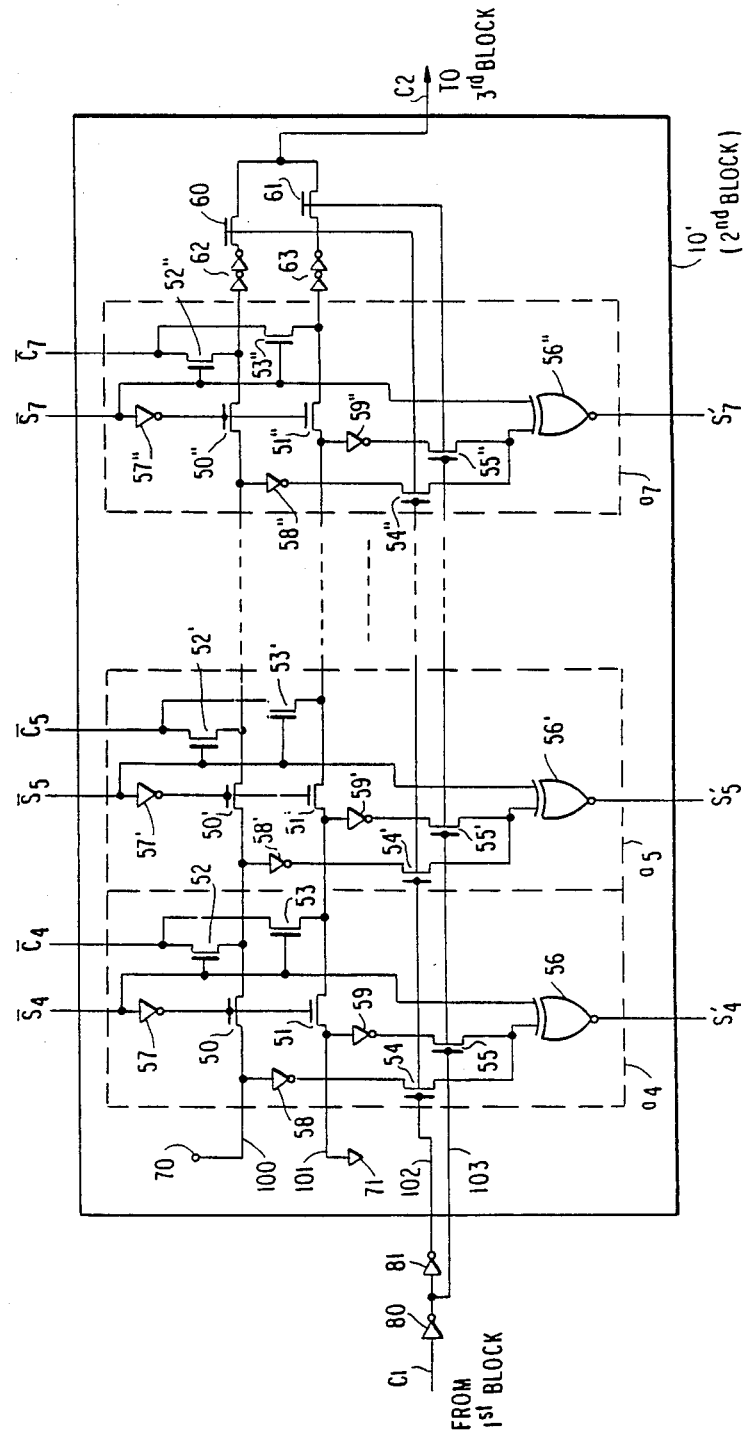
FIG. 5 shows a circuit diagram of a carry circuit of an embodiment according to the present invention.

It should be noted that in FIG. 5 the carry signal C1 from the 1st block is not applied to the propagation lines 100 and 101, but is used as a selecting signal for the selecting transistors 60 and 61. The carry circuit 10' can perform both carry operations which are to be executed when the carry signal C1 from the previous 1st block is present and when the carry signal C1 is absent. Namely, in the case that the carry signal C1 is present, the second propagation line 101 is selected, while in the case that the carry signal C1 is absent, the first propagation line 100 is selected as shown in FIG. 5. In FIG. 5, when the carry signal C1 is present, i.e., a "0" level signal (GND level signal) is applied to the inverter 80, the second transfer gate transistor 51 and the second and fourth switching transistors 53 and 55 are valid, while when the carry signal C1 is absent, i.e., a "1" level signal (A VDD level signal) is applied to the inverter 80, the first transfer gate transistor 50 and the first and third switching transistors 52 and 54 are valid. Since the first and second signal sources 70 and 71 supply the fixed "1" and "0" level potential to the first and second propagation lines 100 and 101, respectively, regardless of the carry signal C1, the above-mentioned two carry operations have been terminated before the carry signal C1 from the 1st block arrives at the inverter 80. In other words, these two carry operations are performed as soon as the $\overline{S4}$ to $\overline{S7}$ signals and the $\overline{C4}$ to $\overline{C7}$ signals are applied to the four stages a4 to a7. Thus, a carry signal C2 can be transferred to the 3rd block at a high speed. The delay period of the 2nd block is only the sum of a transfer period of the carry signal on the lines 102 and 103 and a selecting period of the selecting transistors 60 and 61. Particularly, the above-mentioned two carry operations are performed within the data transfer period T1 of FIG. 2. Therefore, the carry propagation delay time $\Delta t$ is remarkably reduced.

Figure 6:
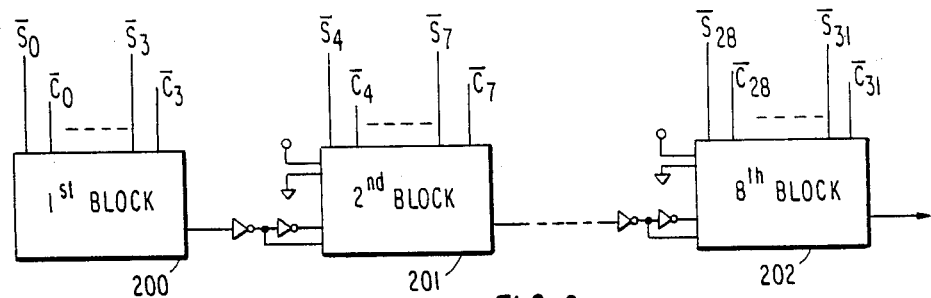
FIG. 6 shows a block diagram of a carry circuit of the present invention used to perform an arithmetic operation on a long data.
Figure 7:
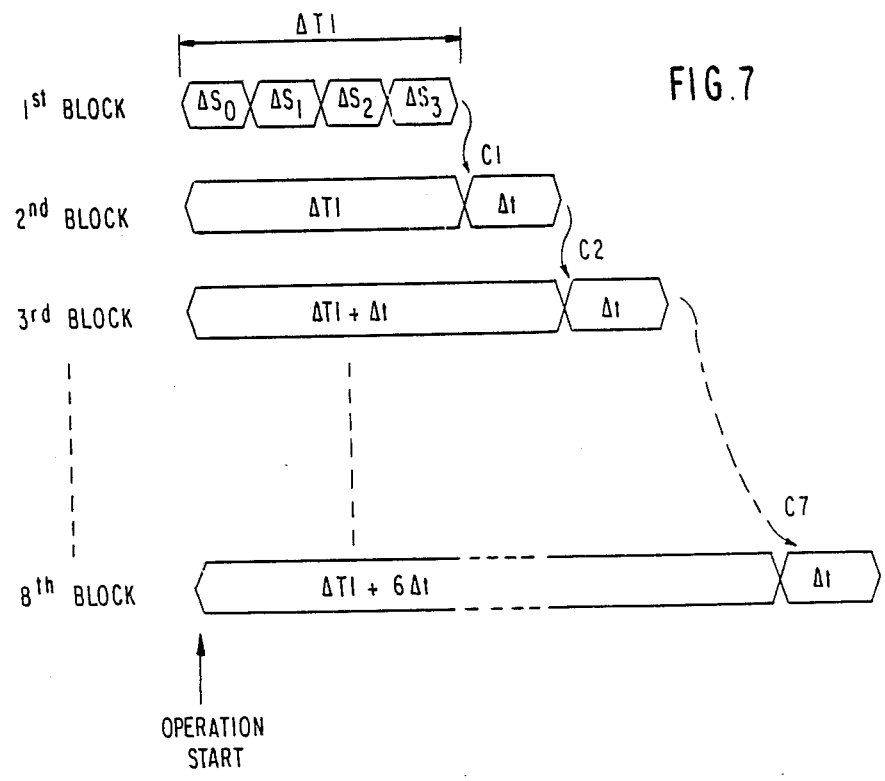
FIG. 7 shows a timing chart indicating a carry propagation delay time of FIG. 6.

FIG. 6 illustrates a carry circuit for a 32-bit adder, and FIG. 7 shows a timing chart indicating a carry propagation delay time in FIG. 6. In the 32-bit adder, 8 blocks are required as shown in FIG. 6. A first block 200 has not received a carry signal at an carry input end, and therefore a delay period T1 which is equal to the sum of delay times $\Delta S0+\Delta S1+\Delta S2+\Delta S3$ spent in the fourth bit portions (A0, B0), (A1, B1), (A2, B2), and (A3, B3) is required. However, in the 2nd to 8th blocks 201 to 202, each carry operation is performed in a short delay time $\Delta t$.

In the prior art of FIG. 4, the total delay period is $8 \times \Delta T1$, while it is only $\Delta T1+6\Delta t$ according to the embodiment shown in FIG. 6.

Figure 8:
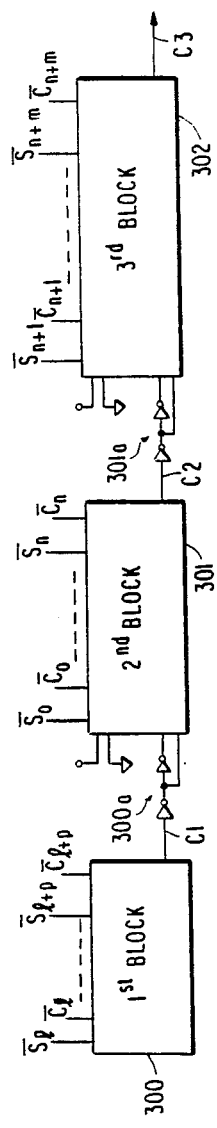
FIG. 8 shows a block diagram of another embodiment of the present invention.
Figure 9:
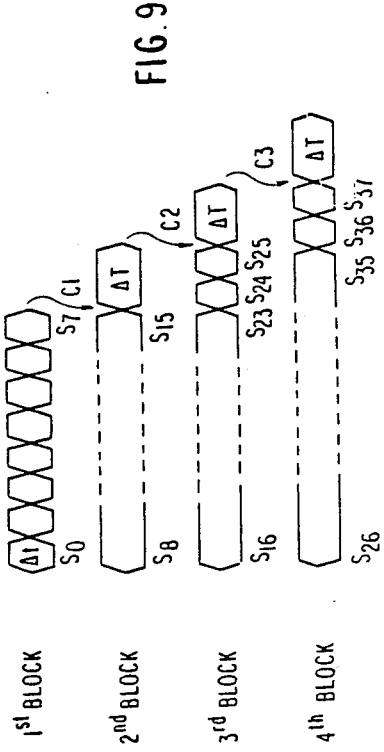
FIG. 9 shows a timing chart indicating a carry propagation delay time of FIG. 8.

FIG. 8 shows the carry circuit of another embodiment including a plurality of blocks. This carry circuit has a first carry block 300, a second carry block 301 coupled to the first block 300 via a buffer circuit 300a, and a third carry block 302 coupled to the second block 301 via a buffer circuit 301a. Into the first block 300 are input the $\overline{SUM}$ signals of each bit $\overline{S}$ to $\overline{S_{+p}}$ and the $\overline{CARRY}$ signal $\overline{C}$ to $\overline{C_{+p}}$, into the second block 301 the $\overline{SUM}$ signals $\overline{S_0}$ to $\overline{S_n}$ and the $\overline{CARRY}$ signals $\overline{C_0}$ to $\overline{C_n}$, and into the third block 302 and $\overline{SUM}$ signals $\overline{S_{n+1}}$ to $\overline{S_{n+m}}$ and the $\overline{CARRY}$ signals $C_{n+1}$ to $C_{n+m}$, respectively.

In the first block 300 consisting of, for example, 8 bits, a carry signal C1 is obtained as a result of each delay $\Delta t$ in each bit portion. In the second block 301, when the carry signal C1 is determined, the above-mentioned selecting operation is executed. If this selecting operation requires a period $\Delta T$ which is equal to $2\Delta t$, the third block 302 may consist of 10 bits, because the arithmetic operation in the block 302 can be executed until the carry signal C2 in the second block has been output, and this block 302 can process for a time longer than the previous block 301 by a factor $\Delta T$. In the same way, each following block can execute the arithmetic operation longer than its preceding block by $\Delta T$, namely the time required for selecting operation of the transistors 60 and 61.

In the case that a plurality of the conventional carry blocks shown in FIG. 4 are coupled in series to execute an addition of long data, the following block can not start a carry operation and a sum operation until a carry signal from the previous block has been applied thereto. On the other hand, according to the carry circuit shown in FIG. 6, each block can simultaneously start a carry operation and a sum operation because waiting for a carry signal from the previous block is not necessary as shown in FIG. 7. With respect to the 1st block, since this block does not receive a carry signal, a first bit section (A0, B0) of the 1st block may receive a "1" level signal indicating no carry signal. Therefore, the 1st block may have only the first propagation line 70 of FIG. 5, that is the circuit elements with respect to the second propagation line are not required. Of course, the selecting lines 102 and 103 and the selecting transistors 60 and 61 also are not required. Each bit section of the 1st block may have the inverter 57, the first transfer gate 50, the first switching transistor 52 and the exclusive NOR circuit 56. Therefore, the same operation period can be assigned to all of the 1st to 8th blocks. In other words, a carry operation for producing a carry signal from the each block and a sum operation for producing the result of the addition have been terminated in the same period if each block has the same bit sections. Here, for the 2nd to the 8th blocks, a selecting operation is added to the above-mentioned two operations. If the period to perform the selecting operation is equal to the period to perform the carry and sum operations in the two bit sections, the carry circuit shown in FIG. 8 can be provided. Thus, as described above, the number of divided blocks in an arithmetic operation of a long bit string (a large number of data bits) can be reduced.

Figure 10:
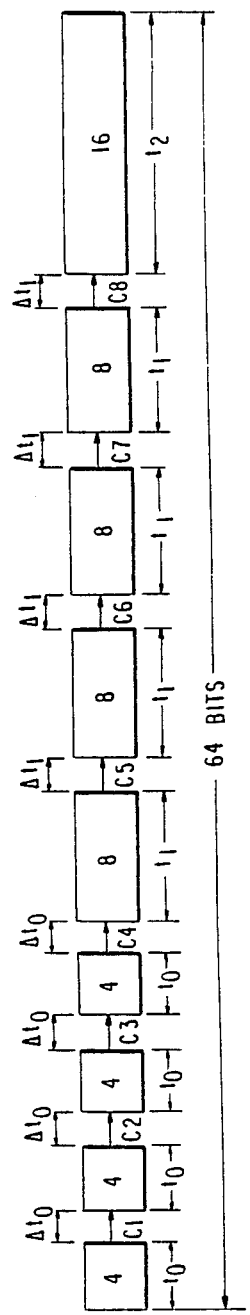
FIG. 10 shows a block diagram of another embodiment suitable for a long bit string of data (e.g., 64 bits).

FIG. 10 shows another embodiment of a preferred carry circuit to suit for an arithmetic operation of 64 bits. In this FIG. 10, 4 bits are assigned to 1st to 4th blocks, respectively. 8 bits are assigned to 5th to 8th blocks, respectively. 16 bits are assigned to 9th block. Each carry operation time of 1st to 4th blocks is $t_0$, and each selecting period of these blocks is $\Delta t_0$. Now, if the $\Delta t_0$ corresponds to 1 bit delay time of the carry operation, the 5th block has a carry operation time $t_1$ equal to 8 bits delay time, so that the 5th block can manipulate 8 bits. Thus, the 9th block can manipulate 16 bits. A $\Delta t_1$ is longer than the $\Delta t_0$ because the selecting lines 102 and 103 of the 5th block is longer than that of the 1st to 4th blocks. According to the delay time, bits to be operated are assigned as shown in FIG. 10. As the result, a long bit string can be processed in a small number of blocks in accordance with a unit of bits to be transferred or to be accessed. In FIG. 10, the unit of bits is 4 bits per one address accessing.

It will be clearly understood that the present invention can be applied to other arithmetic operations, such as subtraction, multiplication, division, or the like.

What is claimed is:

1. A carry circuit having a first block which produces a first carry signal (C1) according to sum data of a first plurality of bits and carry data of said first plurality of bits which are arithmetically operated therein, and a second block (10) which produces a second carry signal (C2) according to said first carry signal and sum data ($S_4$ to $S_7$) of a second plurality of bits and carry data ($C_4$ to $C_7$) of said second plurality of bits which are arithmetically operated therein, said second block comprising:

a carry input terminal receiving said first carry signal;

a first means (70, 71) provided independently of said carry input terminal for generating a first signal having a fixed first level which corresponds to the one of two levels that said first carry signal takes and a second signal having a fixed second level which corresponds to the other of said two levels independently of said first carry signal;

a second means (50, 51, 52, 53, 57, . . . , 50″, 51″, 52″, 53″, 57″) receiving said first signal, said second signal, said sum data of said second plurality of bits and said carry data of said second plurality of bits for producing two output signals independently of said first carry signal before said second block receives said first carry signal, said two output signals having a first level and a second level, respectively, according to said first and second signals when said sum data of said second plurality of bits all have the same one of said first and second levels, a buffer means (62, 63) receiving said two output signals and for providing two buffered output signals, and a third means (60, 61) coupled to said buffer means and said carry input terminal for selecting either one of said two bufferred output signals in accordance with said first carry signal after said second block receives said first carry signal, the selected buffered output signal being outputted from said second block as said second carry signal (C2).

2. A carry circuit as claimed in claim 1, in which the first and second signals comprise to a predetermined voltage level source and a ground level voltage source, respectively.

3. A carry circuit as claimed in claim 1, in which said second block further comprises fourth means (54, 55, 56, 58, 59, . . . , 54″, 55″, 56″, 58″, 59″) receiving said first signal, said second signal, said sum data of said second plurality of bits and said first carry signal for producing an output sum signal ($S_4'$, $S_5'$, . . . , $S_7'$).

* * * * *

UNITED STATES PATENT AND TRADEMARK OFFICE
CERTIFICATE OF CORRECTION

PATENT NO. : 4,845,655
DATED : July 4, 1989
INVENTOR(S) : Yamada et al

It is certified that error appears in the above-identified patent and that said Letters Patent is hereby corrected as shown below:

Column 3, line 15, delete "$B_0$according" and insert --$B_0$ according--.

Column 4, line 14, delete "0".

Column 4, line 39, delete "S4 and S7" and insert --$\overline{S4}$ and $\overline{S7}$--.

Column 4, line 65, delete "C4" and insert --$\overline{C4}$--.

Column 6, line 17, delete "$C_{n+1}$ to $C_{n+m}$" and insert -- $\overline{C_{n+1}}$ to $\overline{C_{n+m}}$ --.

Column 7, line 28, delete "(10)" and insert --(10')--

Column 7, line 30, delete "($S_4$ to $S_7$)" and insert -- ($\overline{S_4}$ to $\overline{S_7}$) --.

UNITED STATES PATENT AND TRADEMARK OFFICE
CERTIFICATE OF CORRECTION

PATENT NO. : 4,845,655

DATED : July 4, 1989

INVENTOR(S) : Yamada et al

It is certified that error appears in the above-identified patent and that said Letters Patent is hereby corrected as shown below:

Column 7, line 31, delete "$(C_4 \text{ to } C_7)$" and insert -- $(\overline{C_4} \text{ to } \overline{C_7})$ --.

Signed and Sealed this

Seventh Day of August, 1990

Attest:

HARRY F. MANBECK, JR.

*Attesting Officer*          *Commissioner of Patents and Trademarks*